United States Patent
Shivaswamy et al.

(10) Patent No.: US 10,217,147 B2
(45) Date of Patent: Feb. 26, 2019

(54) MAPPING PRODUCTS BETWEEN DIFFERENT TAXONOMIES

(71) Applicant: eBay Inc., San Jose, CA (US)

(72) Inventors: Gurudatta Horantur Shivaswamy, Saratoga, CA (US); Hancheng Ge, College Station, TX (US); Lili Yuan, San Jose, CA (US)

(73) Assignee: eBay Inc., San Jose, CA (US)

( * ) Notice: Subject to any disclaimer, the term of this patent is extended or adjusted under 35 U.S.C. 154(b) by 671 days.

(21) Appl. No.: 14/517,505

(22) Filed: Oct. 17, 2014

(65) Prior Publication Data

US 2016/0078507 A1    Mar. 17, 2016

Related U.S. Application Data

(60) Provisional application No. 62/049,590, filed on Sep. 12, 2014.

(51) Int. Cl.
  *G06Q 30/00* (2012.01)
  *G06Q 30/06* (2012.01)
  *G06F 17/30* (2006.01)

(52) U.S. Cl.
  CPC ... *G06Q 30/0605* (2013.01); *G06F 17/30598* (2013.01); *G06F 17/30864* (2013.01);
  (Continued)

(58) Field of Classification Search
  None
  See application file for complete search history.

(56) References Cited

U.S. PATENT DOCUMENTS 8,086,643 B1 * 12/2011 Tenorio .............. G06Q 30/0623
                                                                       706/20
8,275,726 B2   9/2012 Tsaparas et al.
(Continued)

FOREIGN PATENT DOCUMENTS

WO   WO-2016040672 A1   3/2016

OTHER PUBLICATIONS

Steven S. Aanen, et al; "SCHEMA—An Algorithm for Automated Product Taxonomy Mapping in E-commerce"; 2012; Springer-Verlag; E. Simperl et al. (Eds.): ESWC 2012, LNCS 7295, pp. 300-314 (Year: 2012).*

(Continued)

*Primary Examiner* — Naeem U Haq
*Assistant Examiner* — Norman Donald Sutch, Jr.
(74) *Attorney, Agent, or Firm* — Schwegman Lundberg & Woessner, P.A.

(57) ABSTRACT

Techniques for mapping item listings from a first taxonomy to a second taxonomy are described. In an example embodiment, item listings from a first database storing a first taxonomy and item listings from a second database storing a second taxonomy are obtained. Then, for each of the obtained item listings, a plurality of features is extracted, including at least one feature related to an image associated with the item listing and at least one feature related to text associated with the item listing. Then a mapping between item listings in the first taxonomy and item listings in the second taxonomy is created based on the plurality of features extracted by the feature extraction component, wherein the mapping identifies which item listings in the first taxonomy correlate to a same product as which item listings in the second taxonomy.

18 Claims, 7 Drawing Sheets

(52) U.S. Cl.
CPC .. *G06F 17/30917* (2013.01); *G06F 17/30961* (2013.01); *G06Q 30/0629* (2013.01); *G06Q 30/0641* (2013.01)

(56) References Cited

U.S. PATENT DOCUMENTS

| | | | |
|---|---|---|---|
| 8,280,856 | B2 | 10/2012 | Rohan et al. |
| 8,452,773 | B1 | 5/2013 | Young |
| 8,670,609 | B2* | 3/2014 | Imai ............... G06K 9/3241 |
| | | | 382/154 |
| 9,177,059 | B2* | 11/2015 | Musgrove ......... G06F 17/30864 |
| 9,262,784 | B2* | 2/2016 | Shi .................... G06Q 30/0603 |
| 2003/0028469 | A1 | 2/2003 | Bergman |
| 2004/0143600 | A1* | 7/2004 | Musgrove ......... G06F 17/30864 |
| 2004/0254950 | A1 | 12/2004 | Musgrove et al. |
| 2005/0159974 | A1* | 7/2005 | Moss .................... G06Q 30/00 |
| | | | 705/26.1 |
| 2008/0140591 | A1* | 6/2008 | Agarwal ........... G06F 17/30864 |
| | | | 706/12 |
| 2008/0255967 | A1* | 10/2008 | Shi .................... G06Q 30/0603 |
| | | | 705/26.3 |
| 2011/0238455 | A1* | 9/2011 | Duong ................ G06Q 10/063 |
| | | | 705/7.11 |
| 2011/0320454 | A1 | 12/2011 | Hill et al. |
| 2013/0311474 | A1 | 11/2013 | Emanuel |
| 2013/0311475 | A1 | 11/2013 | Emanuel |
| 2013/0315477 | A1* | 11/2013 | Murray ............. G06F 17/30247 |
| | | | 382/159 |
| 2015/0046300 | A1* | 2/2015 | Menipaz .............. G06Q 10/087 |
| | | | 705/28 |
| 2016/0063590 | A1* | 3/2016 | Subramanya ...... G06Q 30/0623 |
| | | | 705/26.61 |
| 2018/0075508 | A1 | 3/2018 | Hewavitharana et al. |

OTHER PUBLICATIONS

"International Application Serial No. PCT/US2015/049478, International Preliminary Report on Patentability dated Mar. 23, 2017", 7 pgs.

"International Application Serial No. PCT/US2015/049478, International Search Report dated Dec. 17, 2015", 2 pgs.

"International Application Serial No. PCT/US2015/049478, Written Opinion dated Dec. 17, 2015", 5 pgs.

* cited by examiner

US 10,217,147 B2

MAPPING PRODUCTS BETWEEN DIFFERENT TAXONOMIES

CROSS-REFERENCE TO RELATED APPLICATION

This application is a Non-Provisional of and claims the benefit of priority under 35 U.S.C. § 119(e) from U.S. Provisional Application Ser. No. 62/049,590, entitled "MAPPING PRODUCTS BETWEEN DIFFERENT TAXONOMIES," filed on Sep. 12, 2014 which is hereby incorporated by reference herein in its entirety.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2013, All Rights Reserved.

TECHNICAL FIELD

The present application relates generally to data processing systems and, in one specific example, to techniques for mapping products between different taxonomies.

BACKGROUND

Conventional retailer websites allow shoppers to browse through a wide variety of products available for sale online. Each retailer website typically hosts multiple product listing webpages that offer various products for sale. Moreover, each retailer website generally maintains its own inventory of products. These different inventories may be stored using different taxonomies for each retailer website. It can be difficult, therefore, to compare products between websites or perform other comparative functions because it can be difficult to determine with precision whether a particular product on one retailer website is identical to a particular product on another retailer website.

BRIEF DESCRIPTION OF THE DRAWINGS

Some embodiments are illustrated by way of example and not limitation in the figures of the accompanying drawings in which.

DETAILED DESCRIPTION

Example methods and systems for competitive pricing analysis and inventory management are described. In the following description, for purposes of explanation, numerous specific details are set forth in order to provide a thorough understanding of example embodiments. It will be evident, however, to one skilled in the art that the present invention may be practiced without these specific details. In an example embodiment, product mappings between different taxonomies is performed in an efficient and effective manner, allowing a system to provide a precise mapping of products in one taxonomy with products in another taxonomy.

Figure 1:
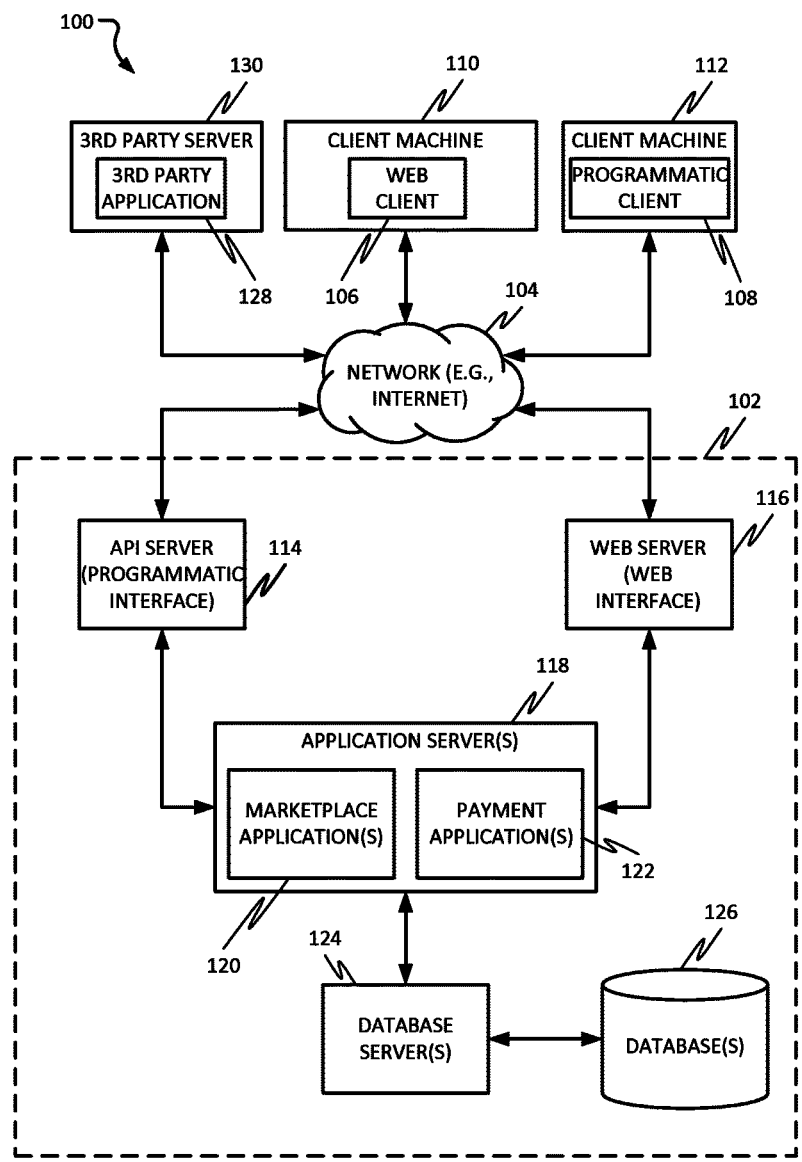
FIG. 1 is a network diagram depicting a client-server system, within which one example embodiment may be deployed.

FIG. 1 is a network diagram depicting a client-server system 100, within which one example embodiment may be deployed. A networked system 102, in the example form of a network-based marketplace or publication system, provides server-side functionality, via a network 104 (e.g., the Internet or a Wide Area Network (WAN)), to one or more clients. FIG. 1 illustrates, for example, a web client 106 (e.g., a browser, such as the Internet Explorer® browser developed by Microsoft® Corporation of Redmond, Washington State) and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course, not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the Turbo Lister application developed by eBay Inc., of San Jose, California) to enable sellers to author and manage listings on the networked system 102 in an offline manner, and to perform batch-mode communications between the programmatic client 108 and the networked system 102.

FIG. 1 also illustrates a third-party application 128, executing on a third-party server 130, as having programmatic access to the networked system 102 via the programmatic interface provided by the API server 114. For example, the third-party application 128 may, utilizing information retrieved from the networked system 102, support one or more features or functions on a website hosted by a third party. The third-party website may, for example, provide one or more promotional, marketplace, or payment functions that are supported by the relevant applications of the networked system 102.

Figure 2:
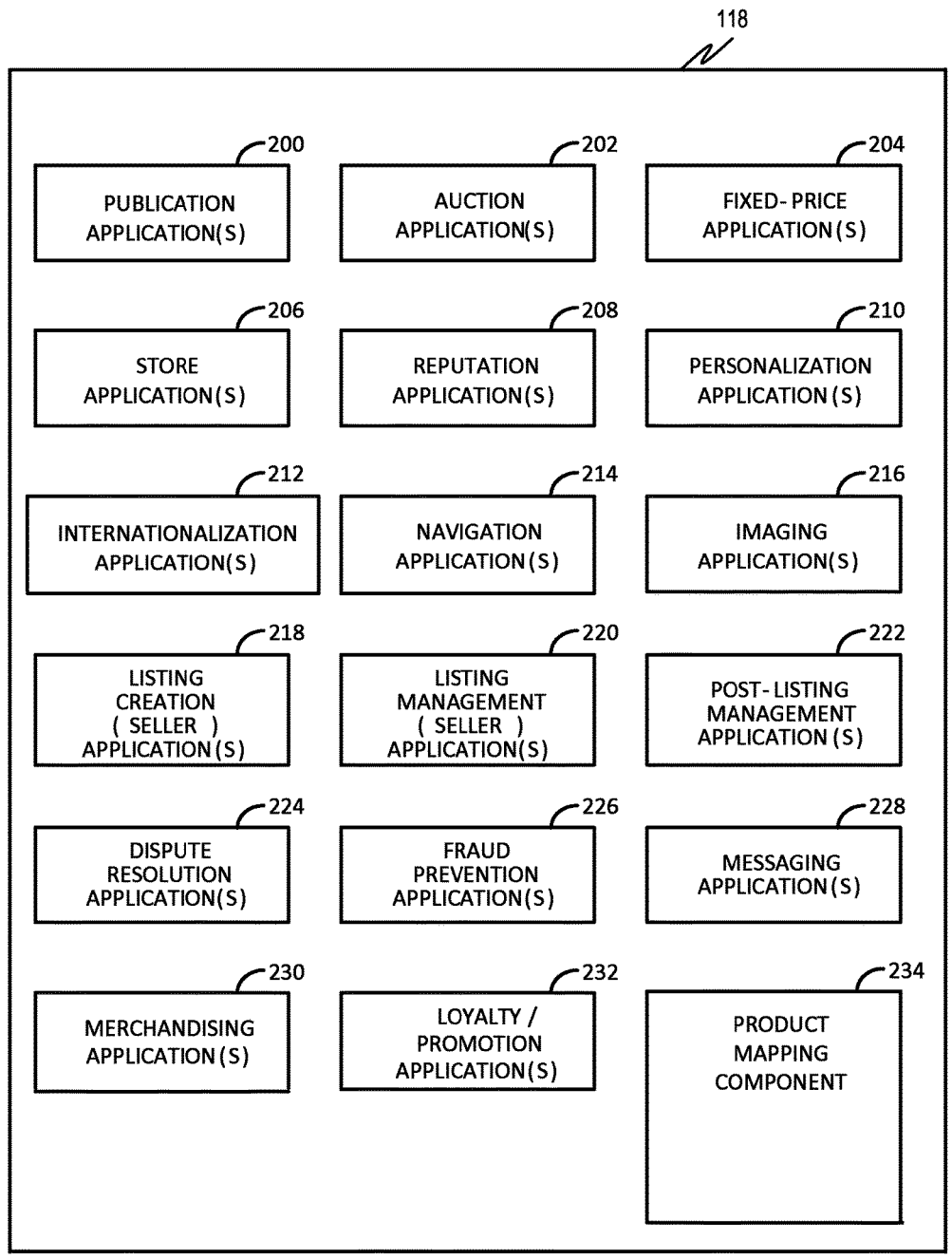
FIG. 2 is a block diagram of an example system, according to various embodiments.

FIG. 2 is a block diagram illustrating marketplace and payment applications 120 and 122 that, in one example embodiment, are provided as part of application server(s) 118 in the networked system 102. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may furthermore access one or more databases 126 via the database servers 124.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions, etc.). The various auction applications 202 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller.

Reputation applications 208 allow users who transact, utilizing the networked system 102, to establish, build, and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (for example, through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example, a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may accordingly include a number of internationalization applications 212 that customize information (and/or the presentation of information by the networked system 102) according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browse applications.

In order to make listings available via the networked system 102 as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102 (such as, for example, messages advising users regarding the status of listings at the networked system 102 (e.g., providing "outbid" notices to bidders during an auction process or providing promotional and merchandising information to users)). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks 104.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotion points for each transaction established and/or concluded with a particular seller, and be offered a reward for which accumulated loyalty points can be redeemed.

Referring back to FIG. 1 above, database 126 may store one or more listings of products for sale by a first ecommerce service. In an example embodiment, these one or more listings of products may be stored in, or at least with reference to, a first product taxonomy. Generally, a taxonomy is a scheme of classification, and thus a product taxonomy is a scheme of classifying products. Often a product taxonomy will take the form of a tree of categories that helps classify a product. For example, a television may be assigned to a category of Electronics, and a sub-category of televisions. It should be noted, however, that these types of taxonomies are merely examples and it is not mandatory that the product taxonomy take the form of a tree of categories.

Referring back to FIG. 2, a product mapping component 234 may act to perform product mapping between products in different taxonomies. In an example embodiment, this may include mapping between product listings stored in the database 126 of FIG. 1 and product listings stored in an outside database, perhaps operated by a different entity than the entity operating database 126. However, it is not mandatory that the two different taxonomies be stored in two different databases and in one example embodiment the two different taxonomies are both stored in database 126.

Figure 3:
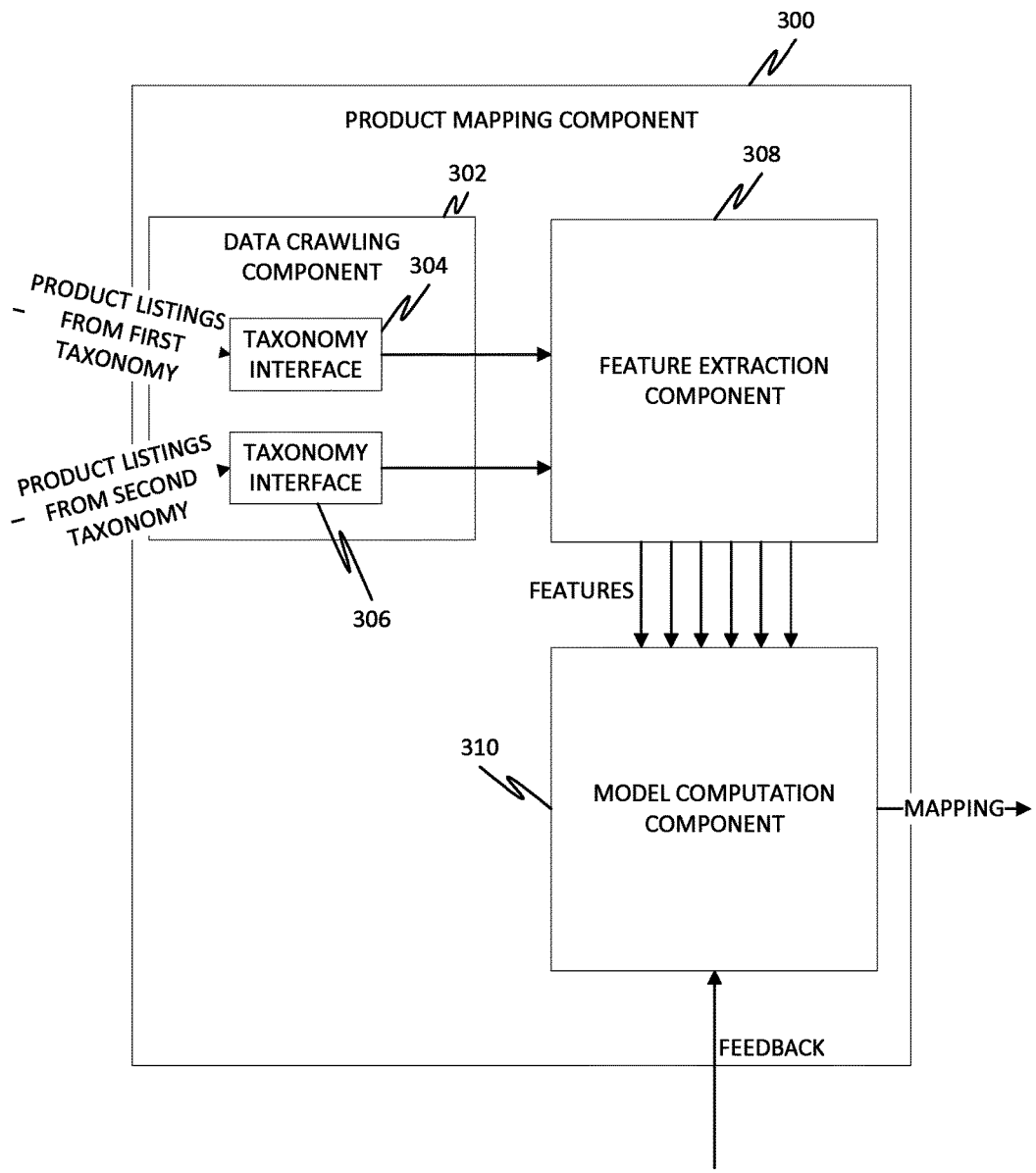
FIG. 3 is a block diagram illustrating a product mapping component 300, in accordance with an example embodiment.

FIG. 3 is a block diagram illustrating a product mapping component 300, in accordance with an example embodiment. In one example embodiment, the product mapping component 300 is the product mapping component 234 of FIG. 2. Product mapping component 300 includes a data crawling component 302. The data crawling component 302 gathers product listing information from both the first taxonomy and the second taxonomy. Indeed, in some example embodiments the data crawling component 302 gathers product listing information from even more additional taxonomies. As such, the data crawling component 302 may include one or more taxonomy interfaces 304, 306 In this example embodiment, interface 304 is used to obtain product listing information from a database operated by the same entity that operates the product mapping component 234, and thus interface 304 may not need to include any advanced translation or mapping features in order to communicate with the database, such as database 126 of FIG. 1. In contrast, interface 306 may be used to obtain product listing information from a database operated by a different entity that operates the product mapping component 234, and thus interface 306 may include advanced translation and/or mapping features in order to communicate with that "outside" database. The result is that the data crawling component 302 obtains product listings from both the first and second (and possibly more) taxonomies.

A feature extraction component 308 may then extract features from the product listings obtained from the first and second (and possibly more) taxonomies. These features may include, for example, image features, text features, and/or extra features. These features will be described in more detail later. It should be noted that in certain embodiments both image features and text features are obtained, but not extra features, but in other embodiments all three types of features are obtained.

The features are then passed to a model computation component 310 that may implement a machine learning model to obtain a mapping between products in the first taxonomy and products in the second taxonomy (the mapping may also include additional mappings if there are additional taxonomies utilized).

The mapping(s) obtained from the model computation component 310 can then be used in a variety of ways in an ecommerce system. In a first example embodiment, the mapping is used in a competitive pricing system. A competitive pricing system is configured to crawl competitor websites for comparative pricing information at various time intervals. For example, the competitive pricing system may be associated with a first marketplace or retailer website, and may access an inventory of products available for sale on the first retailer website. The competitive pricing system may then crawl other retailer websites (e.g., competitor retailer websites) to detect and monitor competitor prices for those products that are available for sale on the first retailer website.

According to various exemplary embodiments, the competitive pricing system is configured to determine if a price for an item on a particular retailer website represents a "deal", based on information crawled from competitor websites. More specifically, a product offered for sale on the retailer website is classified as a "deal" when the competitive pricing system 200 determines that the price is competitive and has a strong likelihood of attracting a sale, in comparison to competitor prices for the equivalent product. For example, if the retailer website price for a given product is lower than a competitor price for the same product, then the retailer website price for the given product may be considered a "deal". In some embodiments, shipping costs, taxes, and other ancillary costs may also be taken into account in the price comparison process.

According to various exemplary embodiments, the competitive pricing system may crawl for competitor prices at various time intervals. For example, the competitive pricing system may crawl for competitor prices for a plurality of products at the same regular time interval (e.g., once a day). In other embodiments, the competitive pricing system may crawl for competitor prices at variable/adjustable time intervals, based on different products in the inventory of the home retailer website. For example, for high demand products on the home retailer website (e.g., the top X % selling products), prices may be monitored at competitor sites and marked in semi-real time (e.g., every few hours, since many competitors change prices for popular items multiple times a day). The frequency of price monitoring/collection can be adjusted (e.g., for less popular products, the competitor price can be crawled once every few days).

In such a competitive pricing system, the mapping obtained from the model computation component 310 may be used to ensure that the products whose prices are being compared between retailer websites are identical products to each other, despite the possibility that identical products may not have identical titles and/or descriptions on the different retailer websites. A competitive pricing component (not pictured) can be used to perform these functions.

In another example embodiment, the mapping obtained from the model computation component 310 may be used to aid in the formation of a listing by a potential seller on a retailer website. For example, a seller may know the identity of the item he or she wishes to sell but not have a sense of a fair price for the item. Identification of the price or prices of the items on competitor websites may be used to suggest a starting point for a price listing. This may be especially valuable in the case of an auction listing, where a seller is often unsure of where to set an opening bid and/or reserve bid price. In another example embodiment, the description of an item on a competitor website may be used to help suggest key words or phrases for the seller to include in a product listing for the product. Thus, the mapping in these cases is used to ensure that the product being listed is reliably matched to the product on another retailer website.

These are merely examples of how the product mapping may be utilized and one of ordinary skill in the art will recognize that there may be other uses not specifically described in this disclosure.

As described briefly above, the feature extraction component 308 may extract features from the product listings obtained from the first and second (and possibly more) taxonomies. This may include image features, text features, and other features. Each of these features may also include one or more subfeatures that can be examined. In various example embodiments, different combinations of these features and subfeatures may be extracted by the feature extraction component 308 and used by the model computation component 310 to build the mapping or mappings, and nothing in this disclosure shall imply that only certain combinations of features and/or subfeatures can be utilized.

Turning first to image mapping, images may be used to help provide additional useful differentiating information for item matching. In many cases, two item listings may be selling the exact same product but their respective sellers may employ different titles and descriptions with the same image.

In an example embodiment, three different types of image features are extracted: Scale-invariant feature transform (SIFT)-based features, color features, and spectrum-based features.

SIFT is a process used to detect and describe local features in images, which can be robustly represented and identify objects in images. Each image is transformed into a large collection of feature vectors, each of which is invariant to image translation, scaling, and rotation, partially invariant to illumination changes, and robust to local geometric distortion with, for example, 128 elements.

While SIFT is traditionally utilized to identify an object in successive images when the object has moved in the period between the images, in the present disclosure SIFT is used to identify the same object in two different product images from two different sources (one from one taxonomy and the other from another taxnomomy). Because the SIFT feature descriptor is invariant to uniform scaling, orientation, and partially invariant to affine distortion and illumination changes, SIFT can reliably identify objects even among clutter and under partial occlusion.

In an example embodiment, SIFT keypoints of objects are first extracted from a set of reference images and stored in a database. An object is recognized in a new image by individually comparing each feature from the new image to this database and finding candidate matching features based on Euclidean distance of their feature vectors. From the full set of matches, subsets of keypoints that agree on the object and its location, scale, and orientation in the new image are identified to filter out good matches. The determination of consistent clusters is performed rapidly by using an efficient hash table implementation of the generalized Hough transform. Each cluster of 3 or more features that agree on an object and its pose is then subject to further detailed model verification and subsequently outliers are discarded. Finally the probability that a particular set of features indicates the presence of an object is computed, given the accuracy of fit and number of probable false matches. Object matches that pass all these tests can be identified as correct with high confidence.

In an example embodiment, interest points in SIFT may be detected as follows. The image is convolved with Gaussian filters at different scales, and then the difference of successive Gaussian-blurred images are taken. Keypoints are then taken as maxima/minima of the Difference of Gaussians (DoG) that occur at multiple scales. Specifically, a DoG image $D(x,y,\sigma)$ is given by $$D(x,y,\sigma)=L(x,y,k_i\sigma)-L(x,y,k_j\sigma),$$

where $L(x,y,k\sigma)$ is the convolution of the original image $I(x,y)$ with the Gaussian blur $G(x,y,k\sigma)$ at scale $k\sigma$, i.e., $$L(x,y,k\sigma)=G(x,y,k\sigma)*I(x,y)$$

Hence a DoG image between scales $k_i\sigma$ and $k_j\sigma$ is just the difference of the Gaussian-blurred images at scales $k_i\sigma$ and $k_j\sigma$. For scale space extrema detection in the SIFT algorithm, the image is first convolved with Gaussian-blurs at different scales. The convolved images are grouped by octave (an octave corresponds to doubling the value of $\sigma$), and the value of $k_i$ is selected so that we obtain a fixed number of convolved images per octave. Then the Difference-of-Gaussian images are taken from adjacent Gaussian-blurred images per octave.

Once DoG images have been obtained, keypoints are identified as local minima/maxima of the DoG images across scales. This is done by comparing each pixel in the DoG images to its eight neighbors at the same scale and nine corresponding neighboring pixels in each of the neighboring scales. If the pixel value is the maximum or minimum among all compared pixels, it is selected as a candidate keypoint.

This keypoint detection step is accomplishing detecting points that are local extrema with respect to both space and scale, in the discrete case by comparisons with the nearest k neighbours in a discretized scale-space volume.

Scale-space extrema detection often produces too many keypoint candidates, some of which are unstable. The next step is to perform a detailed fit to the nearby data for accurate location, scale, and ratio of principal curvatures. This information allows points to be rejected that have low contrast (and are therefore sensitive to noise) or are poorly localized along an edge.

First, for each candidate keypoint, interpolation of nearby data is used to accurately determine its position. The initial approach was to just locate each keypoint at the location and scale of the candidate keypoint. A new approach calculates the interpolated location of the extremum, which substantially improves matching and stability. The interpolation can be done using the quadratic Taylor expansion of the Difference-of-Gaussian scale-space function, $D(x,y,\sigma)$ with the candidate keypoint as the origin. This Taylor expansion is given by:

$$D(x) = D + \frac{\partial D^T}{\partial x}x + \frac{1}{2}x^T \frac{\partial^2 D}{\partial x^2}x$$

where D and its derivatives are evaluated at the candidate keypoint and $x=(x,y,\sigma)$ is the offset from this point. The location of the extremum, $\hat{x}$ is determined by taking the derivative of this function with respect to x and setting it to zero. If the offset $\hat{x}$ is larger than 0.5 in any dimension, then that's an indication that the extremum lies closer to another candidate keypoint. In this case, the candidate keypoint is changed and the interpolation performed instead about that point. Otherwise the offset is added to its candidate keypoint to get the interpolated estimate for the location of the extremum. A similar subpixel determination of the locations of scale-space extrema can be performed in the real-time implementation based on hybrid pyramids.

To discard the keypoints with low contrast, the value of the second-order Taylor expansion $D(x)$ can be computed at the offset $\hat{x}$. If this value is less than 0.03, the candidate keypoint is discarded. Otherwise it is kept, with final scale-space location $y+\hat{x}$, where y is the original location of the keypoint.

The DoG function will have strong responses along edges, even if the candidate keypoint is not robust to small amounts of noise. Therefore, in order to increase stability, the keypoints that have poorly determined locations but have high edge responses can be eliminated.

For poorly defined peaks in the DoG function, the principal curvature across the edge would be much larger than the principal curvature along it. Finding these principal curvatures amounts to solving for the eigenvalues of the second-order Hessian matrix, H:

$$H = \begin{bmatrix} D_{xx} & D_{xy} \\ D_{xy} & D_{yy} \end{bmatrix}$$

The eigenvalues of H are proportional to the principal curvatures of D. It turns out that the ratio of the two eigenvalues, say $\alpha$ is the larger one, and $\beta$ the smaller one, with ratio $r=\alpha/\beta$, is sufficient for SIFT's purposes. The trace of H, i.e., $D_{xx}+D_{yy}$, gives us the sum of the two eigenvalues, while its determinant, i.e., $D_{xx}D_{yy}-D_{xy}^2$, yields the product. The ratio $R=Tr(H)^2/Det(H)$ can be shown to be equal to $(r+1)^2/r$, which depends only on the ratio of the eigenvalues rather than their individual values. R is minimum when the eigenvalues are equal to each other. Therefore the higher the absolute difference between the two eigenvalues, which is equivalent to a higher absolute difference between the two principal curvatures of D, the higher the value of R. It follows that, for some threshold eigenvalue ratio $r_{th}$, if R for a candidate keypoint is larger than $(r_{th}+1)^2/r_{th}$, that keypoint is poorly localized and hence rejected. The new approach uses $r_{th}=10$.

This processing step for suppressing responses at edges is a transfer of a corresponding approach in the Harris operator for corner detection. The difference is that the measure for thresholding is computed from the Hessian matrix instead of a second-moment matrix.

Each keypoint is then assigned one or more orientations based on local image gradient directions. This helps achieve invariance to rotation as the keypoint descriptor can be represented relative to this orientation and therefore achieve invariance to image rotation.

First, the Gaussian-smoothed image $L(x,y,\sigma)$ at the keypoint's scale $\sigma$ is taken so that all computations are performed in a scale-invariant manner. For an image sample $L(x,y)$ at scale $\sigma$, the gradient magnitude, $m(x,y)$, and orientation, $\theta(x,y)$, are precomputed using pixel differences $$m(x, y) = \sqrt{\begin{array}{l}(L(x+1, y) - L(x-1, y))^2 + \\ (L(x, y+1) - 1) - L(x, y-1))^2\end{array}}$$

$$\theta(x, y) = a\tan2(L(x, y+1) - L(x, y-1), L(x+1, y) - L(x-1, y))$$

The magnitude and direction calculations for the gradient are done for every pixel in a neighboring region around the keypoint in the Gaussian-blurred image L. An orientation histogram with, for example, 36 bins can be formed, with each bin covering, for example, 10 degrees. Each sample in the neighboring window added to a histogram bin can then be weighted by its gradient magnitude and by a Gaussian-weighted circular window with a $\sigma$ that is 1.5 times that of the scale of the keypoint. The peaks in this histogram correspond to dominant orientations. Once the histogram is filled, the orientations corresponding to the highest peak and local peaks that are within 80% of the highest peaks are assigned to the keypoint. In the case of multiple orientations being assigned, an additional keypoint can be created having the same location and scale as the original keypoint for each additional orientation.

Previous steps found keypoint locations at particular scales and assigned orientations to them. This ensured invariance to image location, scale and rotation. Now a descriptor vector is computed for each keypoint such that the descriptor is highly distinctive and partially invariant to the remaining variations such as illumination, 3D viewpoint, etc. This step is performed on the image closest in scale to the keypoint's scale.

First a set of orientation histograms can be created on, for example, 4×4 pixel neighborhoods with 8 bins each. These histograms can be computed from magnitude and orientation values of samples in, for example, a 16×16 region around the keypoint such that each histogram contains samples from, for example, a 4×4 subregion of the original neighborhood region. The magnitudes can be further weighted by a Gaussian function with σ equal to one half the width of the descriptor window. The descriptor then becomes a vector of all the values of these histograms. Since there are 4×4=16 histograms each with 8 bins the vector has 128 elements. This vector is then normalized to unit length in order to enhance invariance to affine changes in illumination. To reduce the effects of non-linear illumination a threshold of 0.2 is applied and the vector is again normalized.

Using SIFT key points extracted in the images using, for example, the process outline above, 6 feature may be derived and generated. These six features include belongingness of SIFT points, mean distance of pairs of SIFT key points, standard deviation distance of pairs of SIFT points, sum distance of pairs of SIFT points, ratio of matched SIFT points, and SIFT binary large object (BLOB) distance.

Belongingness of SIFT pots refers to the fact that an image is divided into four sub-regions, in each of which it is checked if a SIFT key point in an image and its matched one in the other image are located in the same subregion on the two images, respectively. Belongingness is then a measure of the number of belonging pairs divided by the number of matched pairs.

Mean distance of pairs of SIFT key points is the calculated average Euclidean distance of SIFT key point pairs between two images.

Standard deviation distance of pairs of SIFT key points is the calculated standard deviation of Euclidean distances of SIFT key point pairs between two images.

Sum distance of pairs of SIFT points is the calculated sum of Euclidean distances of SIFT key point pairs between two images.

Ratio of matched SIFT points is equal to the number of matched SIFT key points (pairs) divided by the number of SIFT key points which are computed as the maximum number of SIFT points from two tested images.

SIFT BLOB distance refers to the fact that an image is divided into nine sub-regions. In each sub-region of an image and the corresponding one in the other image, SIFT points may be matched, and the average distance between these matched SIFT points may also be calculated. These distances can then be averaged as the SIFT BLOB distance between two images.

Turning now to color features, since the color distribution in images is capable of providing a strong indication of similarity, two different color features can be extracted from images. These include color similarity and gray-scale histogram similarity.

Color similarity refers to the fact that the image can be transferred from the Red-Green-Blue (RGB) color space to the Hue-Saturation-Value (HSV) color space in which only H and S planes are extracted. The histogram from each plane can be calculated and normalized. Then the similarities between the histograms in the two images in the H and S plane can be computed and averaged as the color similarity between the two images.

Gray-scale histogram similarity is similar to color similarity except that the gray-scale histogram is what is focused on. In order for this similarity to be obtained, all color images are converted to gray-scale images and histograms from them are extracted. Then the gray-scale histogram similarity is calculated between histograms of two images.

In an example embodiment, the process used to calculate similarity between two images is Manhattan distance, which is the simple sum of the horizontal and vertical components.

Although SIFT-based features and color features can provide plenty of information in terms of image similarity, there are instances where they may not be as useful. Hence, in an example embodiment spectrum-based features can be extracted in addition or in lieu of SIFT-based features and color features. Some spectrum-based features include Structural Similarity Index (SSIM), Discrete Cosine Transform (DCT), Discrete Wavelet Transform (DWT) with SSIM, and Complex Eavelet Transform (CWT) with SSIM.

SSIM is a method for measuring the similarity between two images as a full reference metric to evaluate the image quality, which is designed to improve on traditional methods such as Peak Signal to Noise Ratio (PSNR) and Mean Square Error (MSE), which can be inconsistent with human eye perception. The SSIM can be calculated on sliding windows of an image.

The difference with respect to other techniques mentioned previously such as MSE or PSNR is that these approaches estimate perceived errors; on the other hand, SSIM considers image degradation as perceived change in structural information. Structural information is the idea that the pixels have strong inter-dependencies especially when they are spatially close. These dependencies carry important information about the structure of the objects in the visual scene.

The SSIM metric is calculated on various windows of an image. The measure between two windows x and y of common size N×N is:

$$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)}$$

with $\mu_x$ the average of x;
$\mu_y$ the average of y;
$\sigma_x^2$ the variance of x;
$\sigma_y^2$ the variance of y;
$\sigma_{xy}$ the covariance of x and y;
$c_1=(k_1L)^2$, $c_2=(k_2L)^2$ two variables to stabilize the division with weak denominator;
L the dynamic range of the pixel-values (typically this is $2^{\#bits\ per\ pixel}-1$);
$k_1=0.01$ and $k_2=0.03$ by default.

In order to evaluate the image quality this formula is applied only on luma. The resultant SSIM index is a decimal value between −1 and 1, and value 1 is only reachable in the case of two identical sets of data. Typically it is calculated on window sizes of 8×8. The window can be displaced pixel-by-pixel on the image but the authors propose to use only a subgroup of the possible windows to reduce the complexity of the calculation.

Structural dissimilarity (DSSIM) is a distance metric derived from SSIM (though the triangle inequality is not necessarily satisfied).

$$DSSIM(x, y) = \frac{1 - SSIM(x, y)}{2}$$

DCT expresses a finite sequence of data points in terms of a sum of cosine functions oscillating at different frequencies, which can capture the high-level structural information of the image as well as some macro features. First, all images can be down-sampled to the same size (e.g., 32×32 pixels). Second, all down-sampled images can be converted from color to gray-scale. Then DCT is applied to each of the image. In an example embodiment, the focus may be on the high-entry component of DCT and it can then be binarized based on the mean value in this component. Finally, a Hamming distance may be employed to calculate the similarity between the binarized high-energy components from each pair of images.

DWT is a method causing a wavelet transform using a discrete set of the wavelet scales and translations obeying some defined rules, which causes the signal to be decomposed into a mutually orthogonal set of wavelets. Each image can be considered to be a 2-D signal which can be decomposed into an orthogonal set of wavelets by DWT. In an example embodiment, only 2-level DWT is conducted for images, which generates 7 orthogonal sets including horizontal details in the level 1, vertical details in the level 1, horizontal details in the level 2, vertical details in the level 2, and approximate details in the level 2.

CWT is a complex-valued extension to the DCT described earlier. However, DCT is sensitive to geometric distortions in the image. Hence, CWT ith SSIM is insensitive to small geometric distortions in the image, as it compares the textural and structural properties of localized regions of image pairs.

Turning now to text features, there are generally two types of features related to text: title features and description features. Title features often contain valuable information relevant to mapping products between taxonomies, but problems can be encountered in a variety of cases, such as the same word appearing in different sequences, which potentially causes the word to have completely different meanings, and cases where the title is too short to fain satisfactory performance using traditional natural language processing techniques.

In an example embodiment, features are extracted from titles using bag of words model with term frequency-inverse document frequency (TFIDF)-weighted vectors to calculate similarity scores in various titles. In the bag of words model as a simply vector representation, text is represented as the bag of its words, disregarding grammar and word orders but keeping multiplicity. The essence of the bag of words model is to apply vectors in which the element is the occurrence of each word in the text. TDIDT is a numerical statistic that is intended to reflect how important a word is to a document in a collection or corpus. A Cosine similarity may be employed to calculate the closeness between the titles in the different taxonomies. The Cosine similarity's output is neatly bounded in [0,1]. The higher the Cosine similarity score, the more similar the two items. Meanwhile, Euclidean distance can also be used for calculating the similarity.

In order to determine whether titles in an output pair point to the same item, a threshold above which it is considered the pair is true for the same item can be established, based upon the cosine similarity score.

Edit distance is a way of quantifying how similar two strings are to one another by counting the minimum number of operations required to transform one string into the other, which is also known as the Levenshtein Distance. In an example embodiment, a unique word-based edit distance is used which fits well to measuring title similarity while keeping computation costs low. In order to apply the same threshold value rule, there are two ways to convert the edit distance to one in the range from 0 to 1. The first is the edit distance divided by the total number of distinguished words in both of the compared titles. The second is edit distance divided by the maximum number of words in both of the compared titles.

Latent Semantic Indexing (LSI) is an indexing and retrieval method that uses a technique known as singular value decomposition (SVD) to identify patterns in the relationships between the terms and concepts contained in an unstructured collection of text. LSI is based on the principle that words that are used in the same contexts tend to have similar meanings It is known as LSI because of its ability to correlate semantically related terms that are latent in a collection of text.

An n-gram is a contiguous sequence of n items (here words) from a given sequence of text (here the title). A bag of words technique can be applied but with grams replacing words.

Turning now to description features, there are two main problems encountered when attempting to match descriptions. The first is the need to measure the structural similarity between items in different taxonomies by extracting structural patterns in the description. The other is the need to measure the content similarity between those items.

As far as structural similarity, many sellers directly copy and paste introductions and specifications of an item from other sources, such as manufacturer web sites. Two different techniques can be used to calculate the structural similarity of descriptions in different taxonomies: tree edit distance and pairwise frequency encoded distance.

Figure 4:
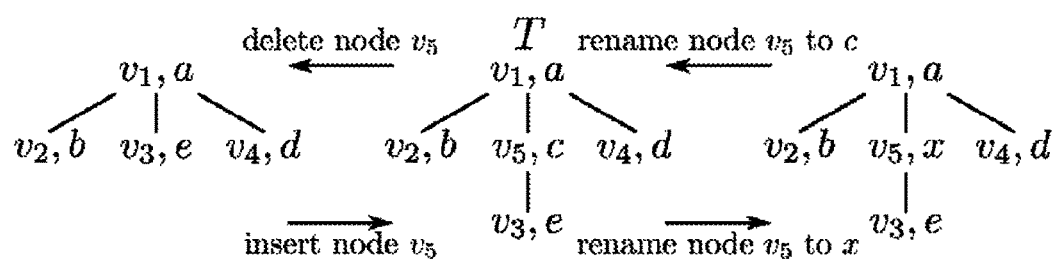
FIG. 4 is a diagram illustrating an example of tree distance in accordance with an example embodiment.

Edit distance is a way of quantifying how dissimilar two strings are to one another by counting the minimum number of operations required to transform one string into the other. Here, the description of an item can be treated as a tree in which each node corresponds to a tag in the description. Taking advantage of the concept of edit distance, the tree distance can be defined and calculated to measure the structural similarity given two descriptions of items. There may be three operations defined, including insert, delete, and substitution. The cost of each operation is counted as 1. FIG. 4 is a diagram illustrating an example of this.

Pairwise frequency encoded distance is used to calculate structural similarity faster than tree edit distance. It is composed of two parts: encoding and Discrete Fourier Transform (DFT). Each description can be considered as a signal by an appropriate encoding. The pairwise encoding is employed to assign an integer by a randomly chosen linear order to each pair of tag instances appearing consecutively in the description. By this encoding, each description can be represented as a discrete signal denoted as a vector. After that, DFT is applied to normalized description signals. Finally, the distance can be calculated between every two descriptions based on the results of DFT in order to reflect differences between the descriptions.

Although text and images can provide a lot of information for mapping products between taxonomies, they still may not be able to address every case that can be encountered. As such, in an example embodiment, additional features may be extracted. These include whether the listings are for the same brand, model name similarity, Universal Product Code (UPC) similarity, and Manufacturer Part Number (MPN) similarity.

Same brand or not is a binary feature indicating whether a listing in one taxonomy refers to the same brand as a listing in another taxonomy.

Model name similarity is a measure of how similar the model names are. Of course, if the model name is exactly the same, there is a high likelihood that the two listings refer to the same products, but even if they are merely similar but not exactly the same, it is possible they refer to the same product as often model names can be mistyped and/or manufacturers sometimes release multiple model names for the same product (e.g., a television sold at one retailer may be given a slightly different model number by a manufacturer than the exact same television sold at another retailer, so that each retailer can claim in advertisements that they have the lowest price on the television). Thus, the similarity between model names can be measured and used as a feature.

UPC similarity has similar features to model name similarity described above. It can be a unique indicator although similarity in UPC codes can also have certain meanings For example, certain manufacturers have unique prefixes they have been assigned for UPC codes, thus two UPC codes sharing the same prefix may indicate they are from the same manufacturer.

Manufacturer part numbers can also be examined for similarity and used as a feature.

Additional features may be computed from the features and sub-features extracted as described above. First, a count of model name appearing in title can be determined. This count can then be compared for listings as an indicated they are more likely the same items.

Second, a difference in count of a special terms can be computed. Commonly, some words play an important role in the title, which usually represent a unique characteristic of the item sellers are selling. For instance, the word "bundle" implies the item is selling along with some accessories. As such, the difference of count of such special terms appearing in the listing can be reflective of the likelihood that the listings point to the same product. Similar processes can be undertaken with the term "kit", "+", "for", and "only."

Regardless of which features and sub-features extracted, the extracted features can then be passed to the model computation component 310. The model computation component 310 can decided to aggregate the features and put them into a machine learning model in order to derive mappings. In an example embodiment, the final features utilized can be ranked. For example, the following ranking could be used:

1) LSI Title Similarity
2) SIFT Blob Distance
3) DCT Similarity
4) CW-SSIM
5) DWT-SSIM
6) SSIM
7) Mean Distance of Pairs of SIFT Key Points
8) Ratio of Matched SIFT Points
9) UPC Similarity
10) MPN Similarity
11) Color Similarity
12) Gray-scale Histogram Similarity
13) Count of Model Name Appearing in Title
14) Model Name Similarity
15) Same Brand or Not
16) Difference of Count of Special Character "for"
17) Difference of Count of Special Character "+"
18) Difference of Count of Special Character "kit"

This ranking then may be used to, for example, weight the various features in the model.

The machine learning model may used any of many different models to derive mappings between item listings from different taxonomies. In one example embodiment, a random forest model may be used. The training algorithm for random forests applies the general technique of bootstrap aggregating, or bagging, to tree learners. Given a training set $X=x_i, \ldots, x_n$ with responses $Y=y_i$ through $y_n$, bagging repeatedly selects a bootstrap sample of the training set and fits trees to these samples:

For b=1 through B:
    Sample, with replacement, n training examples from X, Y; call these $X_b$, $Y_b$.
    Train a decision or regression tree $f_b$ on $X_b$, $Y_b$,
After training, predictions for unseen samples x' can be made by averaging the predictions from all the individual regression trees on x':

$$\hat{f} = \frac{1}{B}\sum_{b=1}^{B} \hat{f}_b(x')$$

or by taking the majority vote in the case of decision trees.

In the above algorithm, B is a free parameter. Typically, a few hundred to several thousand trees are used, depending on the size and nature of the training set. Increasing the number of trees tends to decrease the variance of the model, without increasing the bias. As a result, the training and test error tend to level off after some number of trees has been fit. An optimal number of trees B can be found using cross-validation, or by observing the out-of-bag error: the mean prediction error on each training sample x☐, using only the trees that did not have x☐ in their bootstrap sample.

In another example embodiment, a logical regression model may be used. An explanation of logistic regression begins with an explanation of the logistic function, which takes on values between zero and one:

$$F(t) = \frac{e^t}{e^t + 1} = \frac{1}{1 + e^{-t}},$$

If t is viewed as a linear function of an explanatory variable x (or of a linear combination of explanatory variables), the logistic function can be written as:

$$F(x) = \frac{1}{1 + e^{-(\beta_0 + \beta_1 x)}}.$$

This will be interpreted as the probability of the dependent variable equaling a "success" or "case" rather than a failure or non-case. We also define the inverse of the logistic function, the logit:

$$g(x) = \ln\frac{F(x)}{1 - F(x)} = \beta_0 + \beta_1 x,$$

and equivalently:

$$\frac{F(x)}{1-F(x)} = e^{\beta_0+\beta_1 x}.$$

The logistic function is useful because it can take an input with any value from negative infinity to positive infinity, whereas the output F(x) is confined to values between 0 and 1 and hence is interpretable as a probability. In the above equations, g(x) refers to the logit function of some given linear combination x of the predictors, In denotes the natural logarithm, F(x) is the probability that the dependent variable equals a case, $\beta_0$ is the intercept from the linear regression equation (the value of the criterion when the predictor is equal to zero), $\beta_2 x$ is the regression coefficient multiplied by some value of the predictor, and base e denotes the exponential function.

The formula for F(x) illustrates that the probability of the dependent variable equaling a case is equal to the value of the logistic function of the linear regression expression. This is important in that it shows that the value of the linear regression expression can vary from negative to positive infinity and yet, after transformation, the resulting expression for the probability F(x) ranges between 0 and 1. The equation for g(x) illustrates that the logit (i.e., log-odds or natural logarithm of the odds) is equivalent to the linear regression expression. Likewise, the next equation illustrates that the odds of the dependent variable equaling a case is equivalent to the exponential function of the linear regression expression. This illustrates how the logit serves as a link function between the probability and the linear regression expression. Given that the logit ranges between negative infinity and positive infinity, it provides an adequate criterion upon which to conduct linear regression and the logit is easily converted back into the odds.

If there are multiple explanatory variables, then the above expression $\beta_0+\beta_1 x$ can be revised to $\beta_0+\beta_1 x_1+\beta_2 x_2+ \ldots +\beta_m x_m$. Then when this is used in the equation relating the logged odds of a success to the values of the predictors, the linear regression will be a multiple regression with m explanators; the parameters $\beta_j$ for all j=0, 1, 2, ..., m are all estimated.

The regression coefficients are usually estimated using maximum likelihood estimation. Unlike linear regression with normally distributed residuals, it is not possible to find a closed-form expression for the coefficient values that maximizes the likelihood function, so an iterative process must be used instead, for example Newton's method. This process begins with a tentative solution, revises it slightly to see if it can be improved, and repeats this revision until improvement is minute, at which point the process is said to have converged.

In some instances the model may not reach convergence. When a model does not converge this indicates that the coefficients are not meaningful because the iterative process was unable to find appropriate solutions. A failure to converge may occur for a number of reasons: having a large proportion of predictors to cases, multicollinearity, sparseness, or complete separation.

While individual data will have a dependent variable with a value of zero or one for every observation, with grouped data one observation is on a group of people who all share the same characteristics (e.g., demographic characteristics); in this case the researcher observes the proportion of people in the group for whom the response variable falls into one category or the other. If this proportion is neither zero nor one for any group, the minimum chi-squared estimator involves using weighted least squares to estimate a linear model in which the dependent variable is the logit of the proportion: that is, the log of the ratio of the fraction in one group to the fraction in the other group.

Goodness of fit in linear regression models is generally measured using the $R^2$. Since this has no direct analog in logistic regression, various methods including the following can be used instead.

In linear regression analysis, one is concerned with partitioning variance via the sum of squares calculations—variance in the criterion is essentially divided into variance accounted for by the predictors and residual variance. In logistic regression analysis, deviance is used in lieu of sum of squares calculations. Deviance is analogous to the sum of squares calculations in linear regression and is a measure of the lack of fit to the data in a logistic regression model. Deviance is calculated by comparing a given model with the saturated model—a model with a theoretically perfect fit. This computation is called the likelihood-ratio test:

$$D = -2\ln\frac{\text{likelihood of the fitted model}}{\text{likelihood of the saturated model}}.$$

In the above equation D represents the deviance and In represents the natural logarithm. The log of the likelihood ratio (the ratio of the fitted model to the saturated model) will produce a negative value, so the product is multiplied by negative two times its natural logarithm to produce a value with an approximate chi-squared distribution. Smaller values indicate better fit as the fitted model deviates less from the saturated model. When assessed upon a chi-square distribution, nonsignificant chi-square values indicate very little unexplained variance and thus, good model fit. Conversely, a significant chi-square value indicates that a significant amount of the variance is unexplained.

Two measures of deviance are particularly important in logistic regression: null deviance and model deviance. The null deviance represents the difference between a model with only the intercept (which means "no predictors") and the saturated model. And, the model deviance represents the difference between a model with at least one predictor and the saturated model. In this respect, the null model provides a baseline upon which to compare predictor models. Given that deviance is a measure of the difference between a given model and the saturated model, smaller values indicate better fit. Therefore, to assess the contribution of a predictor or set of predictors, one can subtract the model deviance from the null deviance and assess the difference on a $x_{s-p}^2$ chi-square distribution with degree of freedom equal to the difference in the number of parameters estimated.

Let $$D_{null} = -2\ln\frac{\text{likelihood of null model}}{\text{likelihood of the saturated model}}$$

$$D_{fitted} = -2\ln\frac{\text{likelihood of fitted model}}{\text{likelihood of the saturated model}}.$$

Then

-continued $$D_{fitted} - D_{null} = \left(-2\ln\frac{\text{likelihood of fitted model}}{\text{likelihood of the saturated model}}\right) -$$
$$\left(-2\ln\frac{\text{likelihood of null model}}{\text{likelihood of the saturated model}}\right)$$
$$= -2\left(\ln\frac{\text{likelihood of fitted model}}{\text{likelihood of the saturated model}} - \ln\frac{\text{likelihood of null model}}{\text{likelihood of the saturated model}}\right)$$
$$= -2\ln\frac{\left(\frac{\text{likelihood of fitted model}}{\text{likelihood of the saturated model}}\right)}{\left(\frac{\text{likelihood of null model}}{\text{likelihood of the saturated model}}\right)}$$
$$= -2\ln\frac{\text{likelihood of the fitted model}}{\text{likelihood of null model}}.$$

If the model deviance is significantly smaller than the null deviance then one can conclude that the predictor or set of predictors significantly improved model fit. This is analogous to the F-test used in linear regression analysis to assess the significance of prediction In linear regression the squared multiple correlation, R² is used to assess goodness of fit as it represents the proportion of variance in the criterion that is explained by the predictors. In logistic regression analysis, there is no agreed upon analogous measure, but there are several competing measures each with limitations. Three of the most commonly used indices are examined on this page beginning with the likelihood ratio $R^2$, $R^2_L$:

$$R_L^2 = \frac{D_{null} - D_{model}}{D_{null}}.$$

This is the most analogous index to the squared multiple correlation in linear regression. It represents the proportional reduction in the deviance wherein the deviance is treated as a measure of variation analogous but not identical to the variance in linear regression analysis. One limitation of the likelihood ratio $R^2$ is that it is not monotonically related to the odds ratio, meaning that it does not necessarily increase as the odds ratio increases and does not necessarily decrease as the odds ratio decreases.

If the estimated probabilities are to be used to classify each observation of independent variable values as predicting the category that the dependent variable is found in, the various methods below for judging the model's suitability in out-of-sample forecasting can also be used on the data that were used for estimation—accuracy, precision (also called positive predictive value), recall (also called sensitivity), specificity and negative predictive value. In each of these evaluative methods, an aspect of the model's effectiveness in assigning instances to the correct categories is measured.

After fitting the model, it is likely that administrators will want to examine the contribution of individual predictors. To do so, they will want to examine the regression coefficients. In linear regression, the regression coefficients represent the change in the criterion for each unit change in the predictor. In logistic regression, however, the regression coefficients represent the change in the logit for each unit change in the predictor. Given that the logit is not intuitive, researchers are likely to focus on a predictor's effect on the exponential function of the regression coefficient—the odds ratio (see definition). In linear regression, the significance of a regression coefficient is assessed by computing a t-test. In logistic regression, there are several different tests designed to assess the significance of an individual predictor, most notably the likelihood ratio test and the Wald statistic.

The likelihood-ratio test discussed above to assess model fit is also the recommended procedure to assess the contribution of individual "predictors" to a given model. In the case of a single predictor model, one simply compares the deviance of the predictor model with that of the null model on a chi-square distribution with a single degree of freedom. If the predictor model has a significantly smaller deviance (c.f chi-square using the difference in degrees of freedom of the two models), then one can conclude that there is a significant association between the "predictor" and the outcome. Although some common statistical packages (e.g. SPSS) do provide likelihood ratio test statistics, without this computationally intensive test it would be more difficult to assess the contribution of individual predictors in the multiple logistic regression case. To assess the contribution of individual predictors one can enter the predictors hierarchically, comparing each new model with the previous to determine the contribution of each predictor. (There is considerable debate among statisticians regarding the appropriateness of so-called "stepwise" procedures. They do not preserve the nominal statistical properties and can be very misleading.

Alternatively, when assessing the contribution of individual predictors in a given model, one may examine the significance of the Wald statistic. The Wald statistic, analogous to the t-test in linear regression, is used to assess the significance of coefficients. The Wald statistic is the ratio of the square of the regression coefficient to the square of the standard error of the coefficient and is asymptotically distributed as a chi-square distribution.

$$W_j = \frac{B_j^2}{SE_{B_j}^2}$$

It should be noted that it is not necessary that the model follow a training phase and then a separate execution/use phase. In some example embodiments, training of the model is ongoing, using input received from, for example, users, including sellers and possibly buyers of items whose listings are being compared. For example, the feedback from users may indicate that a particular item listing in one taxonomy does not refer to the same product as a particular item listing in another taxonomy, despite the model indicating a mapping between the two listings. The model then may be revised, perhaps just for this single case, or perhaps adjusting one or more parameters for multiple cases. For example, the mistakenly matched products may have just been mismatched because of a typographical error in one of the listings erroneously assigning one listing an incorrect model number. In such a case, perhaps the model is simply adjusted (or the mapping directly edited) to correct this mismatch. Alternatively, the mistakenly matched products may have been mismatched because the model itself does not work well for collectible one of a kind figurines, who may have very similar titles, images, and descriptions despite being different products. The model may then be adjusted to check to determine if the item pertains to that particular category of product and adjust its coefficients accordingly.

Figure 5:
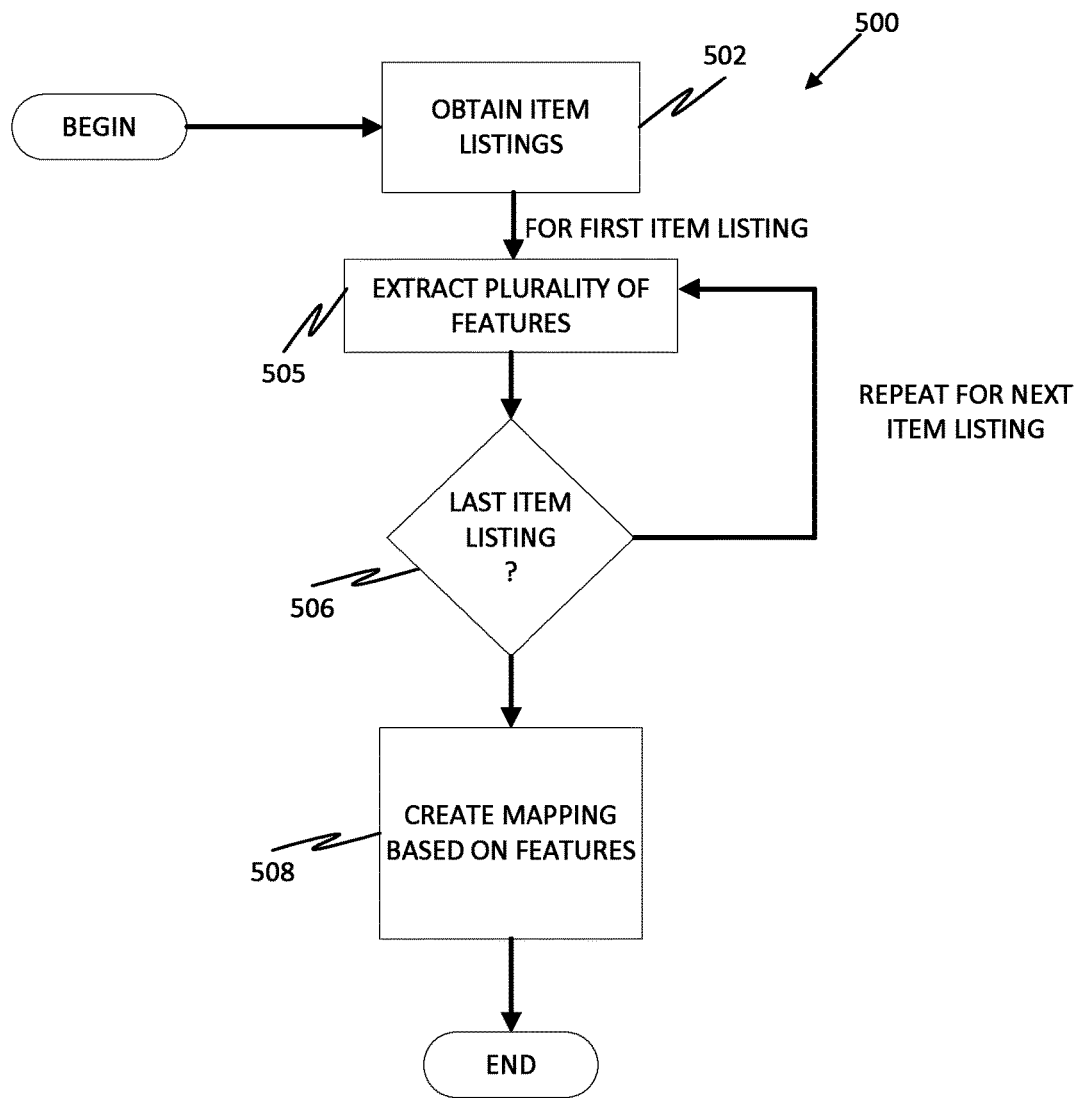
FIG. 5 is a flow diagram illustrating a method of creating a mapping between item listings in two different taxonomies in accordance with an example embodiment.
Figure 6:
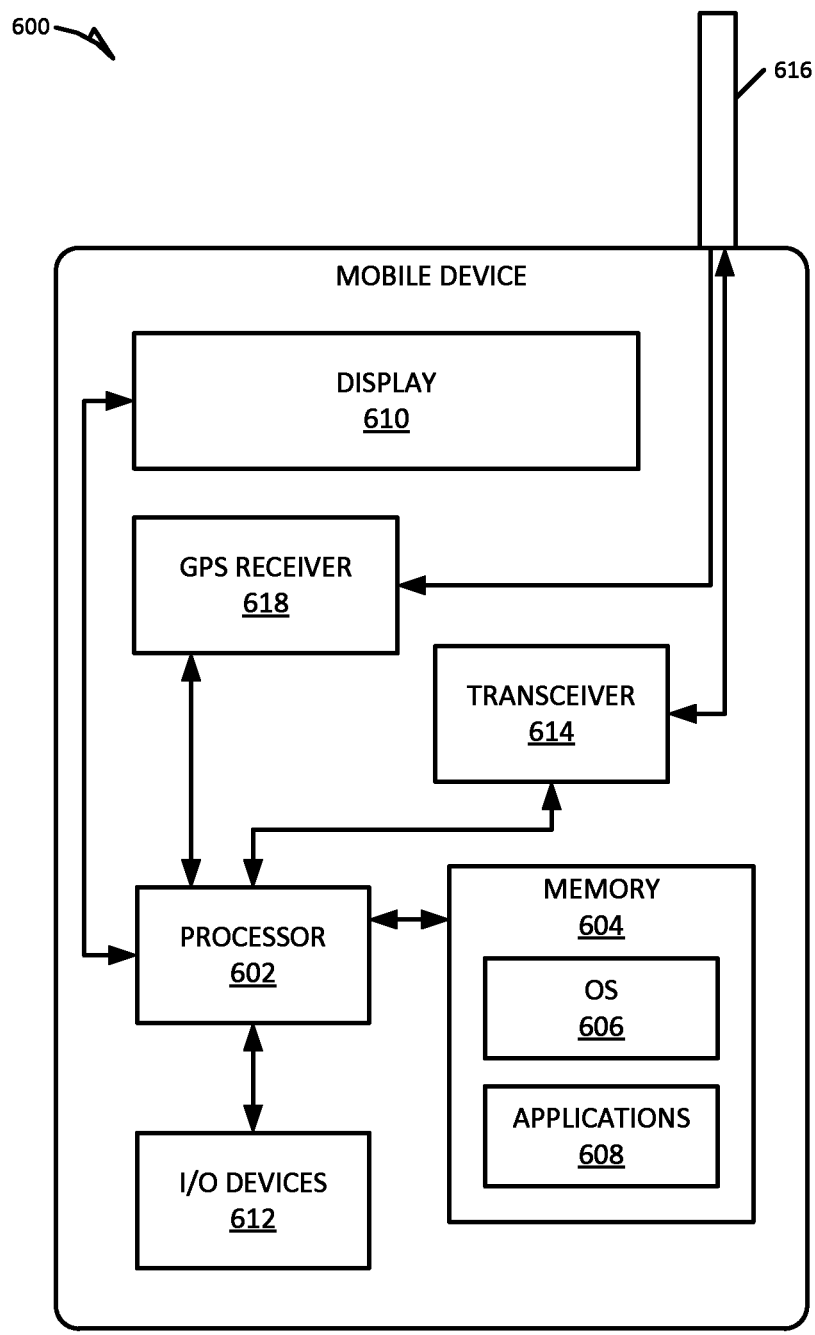
FIG. 6 illustrates an exemplary mobile device, according to various embodiments.

FIG. 5 is a flow diagram illustrating a method of creating a mapping between item listings in two different taxonomies in accordance with an example embodiment. At operation 502, item listings from a first database storing a first taxonomy and item listings from a second database storing a second taxonomy are obtained. In one example embodiment the first and second databases are located in a single physical database operated by a single entity. In another example embodiment, the first database is located in a first physical database operated by a first entity while the second database is located in a second physical database operated by a second entity. The process then goes into a loop for each of the obtained item listings, beginning with a first Obtained item listing. At operation 505, a plurality of features is extracted, including at least one feature related to an image associated with the item listing and at least one feature related to text associated with the item listing. In an example embodiment, additional features may be computed from these features. In another example embodiments, features other than those related to an image or text associated with the item listing may be obtained. At operation 506, a mapping is created between item listings in the first taxonomy and item listings in the second taxonomy based on the plurality of features. This mapping identifies which item listings in the first taxonomy correlate to Example Mobile Device FIG. 6 is a block diagram illustrating a mobile device 600, according to an example embodiment. The mobile device 600 may include a processor 602. The processor 602 may be any of a variety of different types of commercially available processors suitable for mobile devices (for example, an XScale architecture microprocessor, a microprocessor without interlocked pipeline stages (MIPS) architecture processor, or another type of processor 602). A memory 604, such as a random access memory (RAM), a flash memory, or other type of memory, is typically accessible to the processor 602. The memory 604 may be adapted to store an operating system (OS) 606, as well as applications 608, such as a mobile location-enabled application that may provide location-based services (LBSs) to a user. The processor 602 may be coupled, either directly or via appropriate intermediary hardware, to a display 610 and to one or more input/output (I/O) devices 612, such as a keypad, a touch panel sensor, a microphone, and the like. Similarly, in some embodiments, the processor 602 may be coupled to a transceiver 614 that interfaces with an antenna 616. The transceiver 614 may be configured to both transmit and receive cellular network signals, wireless data signals, or other types of signals via the antenna 616, depending on the nature of the mobile device 600. Further, in some configurations, a GPS receiver 618 may also make use of the antenna 616 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors 602 may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field-programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors 602 that are temporarily configured (e.g., by software) or permanently configured to perform the relevant operations. Whether temporarily or permanently configured, such processors 602 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 602 or processor-implemented modules.

The performance of certain of the operations may be distributed among the one or more processors 602, not only residing within a single machine, but deployed across a number of machines. In some example embodiments, the processor 602 or processors 602 may be located in a single location (e.g., within a home environment, an office environment, or a server farm), while in other embodiments the processors 602 may be distributed across a number of locations.

The one or more processors 602 may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors 602 executing a computer program to perform functions by operating on input data and generating output. Method operations can also be performed by, and apparatus of example embodiments may be implemented as, special-purpose logic circuitry, e.g., a field-programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 602), or in a combination of permanently and temporarily configured hardware may be a design choice. Below are set out hardware (e.g., machine) and software architectures that may be deployed, in various example embodiments.

Example Machine Architecture and Machine-Readable Medium

Figure 7:
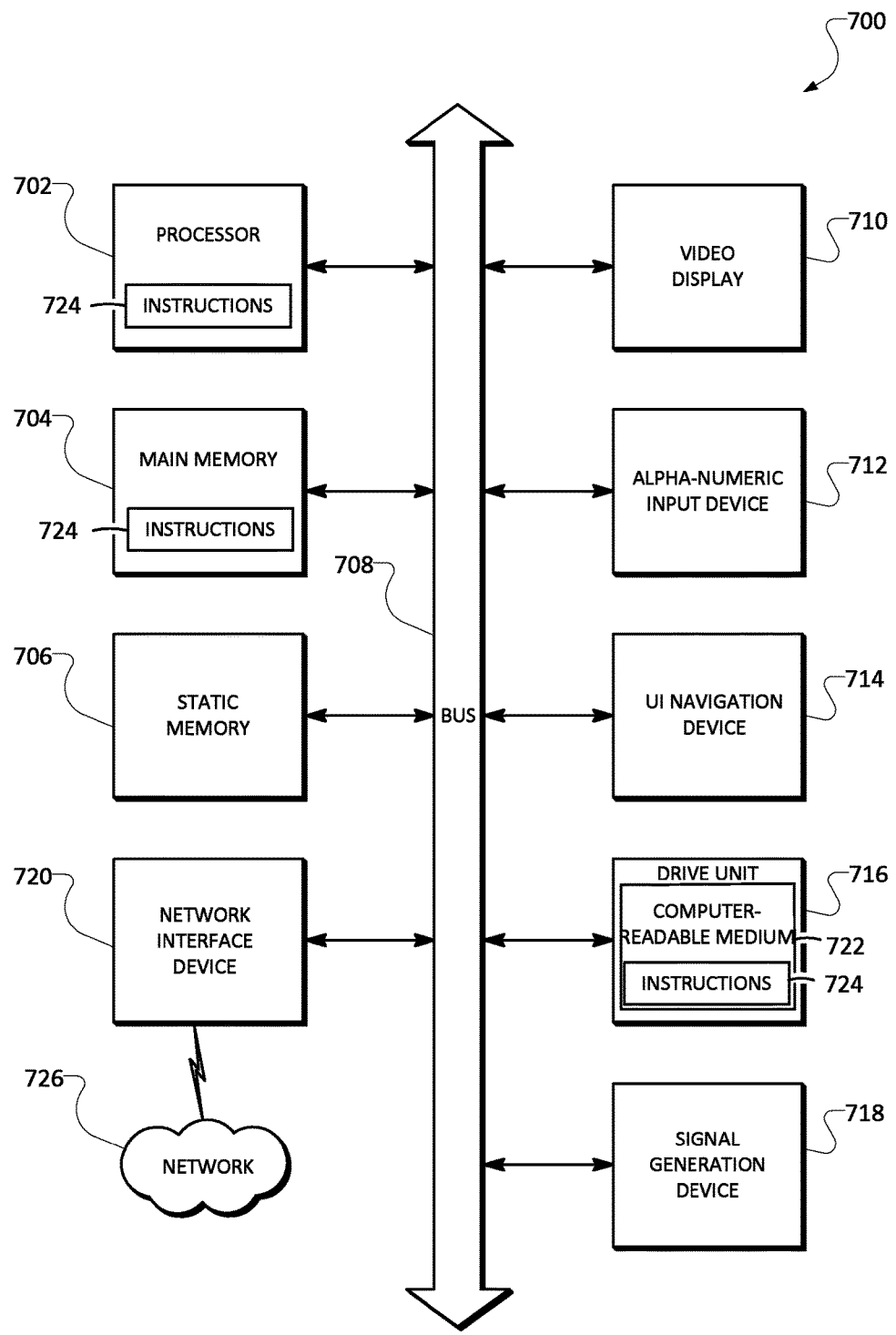
FIG. 7 is a diagrammatic representation of a machine in the example form of a computer system within which a set of instructions, for causing the machine to perform any one or more of the methodologies discussed herein, may be executed.

FIG. 7 is a block diagram of a machine in the example form of a computer system 700 within which instructions 724 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display 710 (e.g., a liquid crystal display (LCD) or a cathode ray tube (CRT)). The computer system 700 also includes an alphanumeric input device 712 (e.g., a keyboard or a touch-sensitive display screen), a user interface (UI) navigation (e.g., cursor control) device 714 (e.g., a mouse), a drive unit 716, a signal generation device 718 (e.g., a speaker) and a network interface device 720.

Machine-Readable Medium

The drive unit 716 includes a computer-readable medium 722 on which is stored one or more sets of data structures and instructions 724 (e.g., software) embodying or utilized by any one or more of the methodologies or functions described herein. The instructions 724 may also reside, completely or at least partially, within the main memory 704 and/or within the processor 702 during execution thereof by the computer system 700, the main memory 704 and the processor 702 also constituting computer-readable media 722.

While the computer-readable medium 722 is shown in an example embodiment to be a single medium, the term "computer-readable medium" may include a single medium or multiple media (e.g., a centralized or distributed database, and/or associated caches and servers) that store the one or more instructions 724 or data structures. The term "computer-readable medium" shall also be taken to include any tangible medium that is capable of storing, encoding or carrying instructions 724 for execution by the machine and that cause the machine to perform any one or more of the methodologies of the present disclosure, or that is capable of storing, encoding or carrying data structures utilized by or associated with such instructions 724. The term "computer-readable medium" shall accordingly be taken to include, but not be limited to, solid-state memories, and optical and magnetic media. Specific examples of computer-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 may further be transmitted or received over a network 726 using a transmission medium. The instructions 724 may be transmitted using the network interface device 720 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., WiFi and WiMAX networks). The term "transmission medium" shall be taken to include any intangible medium that is capable of storing, encoding or carrying instructions 724 for execution by the machine, and includes digital or analog communications signals or other intangible media to facilitate communication of such software.

Although the inventive subject matter has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced.

The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
   a first database storing item listings in a first taxonomy, the first taxonomy having a first set of categories organized in a first hierarchy;
   a second database storing item listings in a second taxonomy, the second taxonomy having a second set of categories organized in a second hierarchy;
   a data crawling component executable by a processor and configured to obtain item listings from the first database classified in the first taxonomy and the second database classified in the second taxonomy;
   a feature extraction component configured to:
   extract a plurality of training features, including at least one image feature and one text feature, for a plurality of training listings classified under a plurality of different taxonomies; and
   for each of the obtained item listings, extract a plurality of features, including at least one feature related to an image associated with the item listing and at least one feature related to text associated with the item listing, the at least one feature relating to an image comprising at least one scale-invariant feature transform (SIFT) feature, performed by a processor; and
   a model computation component configured to:
   in a training phase, input the extracted plurality of training features into a machine learning algorithm to train a machine learning model to output a mapping between a listing in one taxonomy and a listing in another taxonomy for a given input of a plurality of features;
   in a runtime phase, create a mapping between item listings in the first taxonomy and item listings in the second taxonomy based on the plurality of features for the obtained item listings by inputting the plurality of features into the machine learning model, wherein the mapping identifies which item listings in the first taxonomy correlate to a same product as which item listings in the second taxonomy, wherein a first item listing in the first taxonomy correlates to a same product as a second item listing in the second taxonomy if the first item listing offers to sell the same product as the second item listing.

2. The system of claim 1, wherein the first database and the second database are a single physical database operated by a single entity.

3. The system of claim 1, wherein the first database is operated by one entity and the second database is operated by a different entity.

4. The system of claim 1, wherein each of the first and second taxonomies take the form of a tree of categories organizing respective item listings.

5. The system of claim 1, further comprising a competitive pricing component configured to use the mapping to indicate whether a retailer service corresponding to the first taxonomy offers a lowest price on an item.

6. The system of claim 1, further comprising a listing creation application configured to use information obtained with the mapping to aid a seller in entering information needed when creating an item listing in the first taxonomy.

7. A method comprising:
   extracting a plurality of training features, including at least one image feature and one text feature, for a plurality of training listings classified under a plurality of different taxonomies;
   inputting the extracted plurality of training features into a machine learning algorithm to train a machine learning model to output a mapping between a listing in one taxonomy and a listing in another taxonomy for a given input of a plurality of features;
   obtaining item listings from a first database storing a first taxonomy and item listings from a second database storing a second taxonomy, the first taxonomy having a first set of categories organized in a first hierarchy and the second taxonomy having a second set of categories organized in a second hierarchy;
   for each of the obtained item listings, extracting a plurality of features, including at least one feature related to an image associated with the item listing and at least one feature related to text associated with the item listing, the at least one feature relating to an image comprising at least one scale-invariant feature transform (SIFT) feature, performed by a processor; and
   creating a mapping between item listings in the first taxonomy and item listings in the second taxonomy based on the plurality of features of the obtained item listings by inputting the plurality of features into the machine learning model, wherein the mapping identifies which item listings in the first taxonomy correlate to a same product as which item listings in the second taxonomy, wherein a first item listing in the first taxonomy correlates to a same product as a second item listing in the second taxonomy if the first item listing offers to sell the same product as the second item listing.

8. The method of claim 7, further comprising, for each of the obtained item listing, extracting at least one feature related to the item listing, but other than a feature related to an image and a feature related to text.

9. The method of claim 7, wherein the at least one feature relating to an image comprises a color feature.

10. The method of claim 7, wherein the at least one feature relating to an image comprises a spectrum-based feature.

11. The method of claim 7, wherein the at least one feature related to text comprises a title.

12. The method of claim 7, wherein the at least one feature related to text comprises a description.

13. The method of claim 8, wherein the at least one feature related to the item listing, but other than a feature related to an image and a feature related to text, comprises a Universal Product Code (UPC).

14. The method of claim 7, wherein the machine learning model is based on a random forest model.

15. The method of claim 7, wherein the machine learning model is based on a logistic regression model.

16. The method of claim 7, further comprising:
receiving feedback from a user with regard to one or more of the item listings; and
using the feedback in the machine learning model to update the machine learning model; and
creating a new mapping based on the update to the machine learning model.

17. A non-transitory machine-readable storage medium comprising instructions, which when implemented by one or more machines, cause the one or more machines to perform operations comprising:

extracting a plurality of training features, including at least one image feature and one text feature, for a plurality of training listings classified under a plurality of different taxonomies;
inputting the extracted plurality of training features into a machine learning algorithm to train a machine learning model to output a mapping between a listing in one taxonomy and a listing in another taxonomy for a given input of a plurality of features;
obtaining item listings from a first database storing a first taxonomy and item listings from a second database storing a second taxonomy, the first taxonomy having a first set of categories organized in a first hierarchy and the second taxonomy having a second set of categories organized in a second hierarchy;
for each of the obtained item listings, extracting a plurality of features, including at least one feature related to an image associated with the item listing and at least one feature related to text associated with the item listing, the at least one feature relating to an image comprising at least one scale-invariant feature transform (SIFT) feature, performed by a processor; and
creating a mapping between item listings in the first taxonomy and item listings in the second taxonomy based on the plurality of the obtained item listings by inputting the plurality of features into the machine learning model, wherein the mapping identifies which item listings in the first taxonomy correlate to a same product as which item listings in the second taxonomy, wherein a first item listing in the first taxonomy correlates to a same product as a second item listing in the second taxonomy if the first item listing offers to sell the same product as the second item listing.

18. The non-transitory machine-readable storage medium of claim 17, further comprising performing computing at least one additional feature from the plurality of features.

* * * * *